(12) United States Patent
Park

(10) Patent No.: US 8,394,528 B2
(45) Date of Patent: Mar. 12, 2013

(54) LITHIUM POLYMER BATTERY

(75) Inventor: Seokryun Park, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 895 days.

(21) Appl. No.: 12/103,199

(22) Filed: Apr. 15, 2008

(65) Prior Publication Data

US 2008/0292954 A1  Nov. 27, 2008

(30) Foreign Application Priority Data

May 21, 2007 (KR) .................. 10-2007-0049253

(51) Int. Cl.
*H01M 2/02* (2006.01)
*H01M 2/00* (2006.01)
*H01M 2/08* (2006.01)

(52) U.S. Cl. .......... 429/168; 429/65; 429/170; 429/175; 429/180; 429/163

(58) Field of Classification Search .................. None
See application file for complete search history.

(56) References Cited

U.S. PATENT DOCUMENTS

| | | | |
|---|---|---|---|
| 6,492,058 B1 * | 12/2002 | Watanabe et al. | 429/121 |
| 2006/0035141 A1 * | 2/2006 | Lee | 429/176 |
| 2006/0266542 A1 * | 11/2006 | Yoon | 174/112 |

FOREIGN PATENT DOCUMENTS

| | | | |
|---|---|---|---|
| CN | 2722445 Y | | 8/2005 |
| JP | 2006066290 A | * | 3/2006 |
| KR | 2004-90690 | | 10/2004 |
| KR | 2005-81175 | | 8/2005 |
| KR | 10-699686 | | 3/2007 |
| KR | 2007-56429 | | 6/2007 |

OTHER PUBLICATIONS

Machine Translation of Toya (JP 2006066290 A).*
KR 2005-55580 dated Jun. 13, 2005. (English Abstract).

* cited by examiner

*Primary Examiner* — Maria J Laios
*Assistant Examiner* — Robert S Carrico
(74) *Attorney, Agent, or Firm* — Knobbe Martens Olson & Bear LLP

(57) ABSTRACT

A lithium polymer battery where the corrosion or the electrical short resulting from contact of the metal film of the cut region of external material with the connecting lead or the terminal of the adjacent protective circuit cover can be prevented. The lithium polymer battery comprises: a chargeable and dischargeable bare cell; a protective circuit cover installed on one side surface of the bare cell so as to be electrically coupled to the bare cell; and a holder cap installed between the protective circuit cover and the bare cell so as to block contact between the bare cell and a terminal of the protective circuit cover.

10 Claims, 3 Drawing Sheets

LITHIUM POLYMER BATTERY

CROSS-REFERENCE TO RELATED APPLICATIONS

This application claims the benefit of Korean Application No. 2007-49253, filed May 21, 2007 in the Korean Intellectual Property Office, disclosure of which is incorporated herein by reference.

BACKGROUND OF THE INVENTION

1. Field of the Invention

Aspects of the present invention relate to a secondary battery, and more particularly, to a lithium polymer battery with improved stability and that includes a protective circuit cover and pouch type exterior material.

2. Description of the Related Art

Generally, a lithium polymer battery comprises an electrode assembly, pouch type exterior material receiving the electrode assembly, and a protective circuit cover placed on one side of the exterior material so as to be electrically coupled to the electrode assembly.

The electrode assembly is formed by laminating a first electrode plate, a separator and a second electrode plate, and winding them in a jelly-roll shape. The first and second electrode plates are coupled to a first electrode tap and a second electrode tap respectively, and the taps are drawn out to an outer side of the exterior material when the electrode assembly is received in the inside of the exterior material.

The exterior material is a soft pouch type, and comprises insulating layers on both sides of a metal film such as aluminum, etc. The protective circuit cover includes connecting terminals that are coupled to the electrode taps and is arranged on a front surface of the exterior material.

The exterior material includes a first region receiving the electrode assembly and a second region integrally formed on one end of the first region. The second region covers the electrode assembly when the electrode assembly is received in the inside of the first region, and both the side surfaces and a front surface of the first and second regions are heat-bonded.

Although both the side surfaces and the front surface of the first and second regions are heat-bonded, a cut region of the exterior material of the lithium polymer battery is exposed to the outside. Therefore, a portion of the metal film of the exterior material which is mostly surrounded by insulating layers, is exposed to the outside. More specifically, there is a high probability that the metal film is exposed at a leading edge region of both side surfaces of the exterior material such that it can be contacted with both end regions of the protective circuit cover formed on the front surface of the exterior material.

Conventionally, if the metal film exposed at the leading edge region of both side surfaces of the exterior material comes in contact with a pattern or a terminal of the protective circuit cover, the exterior material is corroded or, as time passes, a minute electrical short occurs between them.

Also conventionally, components on the protective circuit cover are damaged by the injection pressure of melting resin because a protective circuit element or a terminal of the protective circuit cover is installed at a position adjacent to the injection passage of the melting resin when the protective circuit cover is combined with the bare cell by a hot melt method.

SUMMARY OF THE INVENTION

An aspect of the present invention provide a lithium polymer battery that can prevent damage to a bare cell by interrupting contact between the terminal of a protective circuit cover and the exterior material of the bare cell where the damage could otherwise be caused by corrosion of the exterior material or occurrence of an electrical short.

Another aspect of the present invention provides a lithium polymer battery that can protect components of a protective circuit cover by reducing the injection pressure of melting resin injected across the protective circuit cover.

Therefore, an example embodiment of the present invention provides a lithium polymer battery comprising: a chargeable and dischargeable bare cell; a protective circuit cover installed on one side surface of the bare cell so as to be electrically coupled to the bare cell; and a holder cap installed between the protective circuit cover and the bare cell so as to interrupt contact between the bare cell and a terminal of the protecting circuit cover.

The holder cap should be installed at a position where a protective circuit element or a tap connection terminal installed on one surface of the protective circuit cover can be hidden. The holder cap is then installed on at least one end part of the protective circuit cover.

The holder cap may be formed in a shape that wraps around an outer surface, a part of an inner surface and edges of the protective circuit cover. Preferably, the holder cap is formed in a rectangular shape, and includes an outer cap and an inner cap formed to be spaced apart from each other as well as a body formed integrally with the outer cap and the inner cap. A locking ridge may be formed on an end part of at least one of the outer cap and the inner cap so that the outer cap or the inner cap is kept from separating from the protective circuit cover by the locking ridge.

The holder cap is inserted and fixed on an edge of the protective circuit cover by a force insertion method so that the holder cap cannot be separated easily from the protective circuit cover. The holder cap may be formed of any insulating material.

The bare cell should include an electrode assembly comprising a first electrode plate equipped with a first electrode tap, a second electrode plate equipped with a second electrode tap, and a separator interposed between the first electrode plate and the second electrode plate, as well as exterior material that receives the electrode assembly. The exterior material includes metal film and insulating layers formed on both surfaces of the metal film. It is desirable that a tap connection terminal be coupled to the first electrode tap and the second electrode tap of the bare cell, a protective circuit element be included on one surface of the protective circuit cover, and an outer terminal be included on the other surface of the protective circuit cover.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
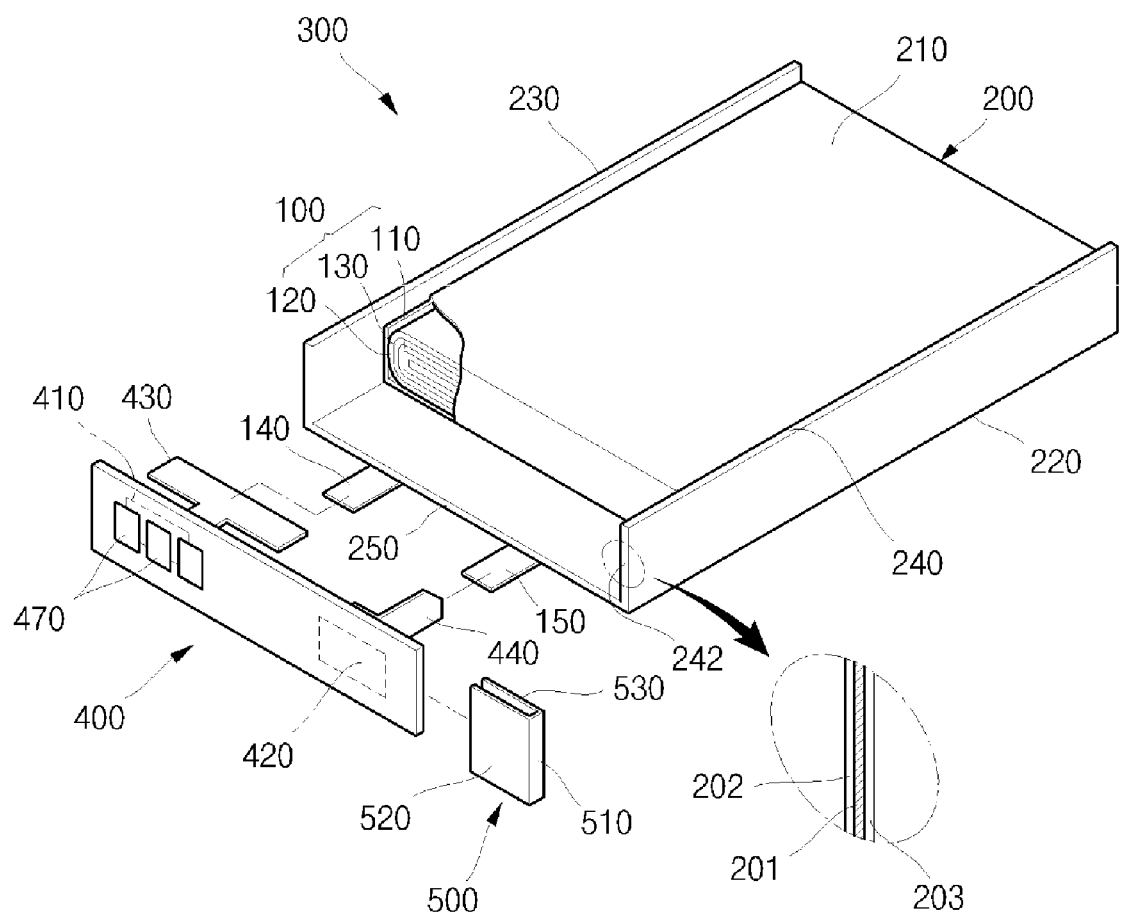
FIG. 1 is an exploded perspective view illustrating a lithium polymer battery, according to a first example embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
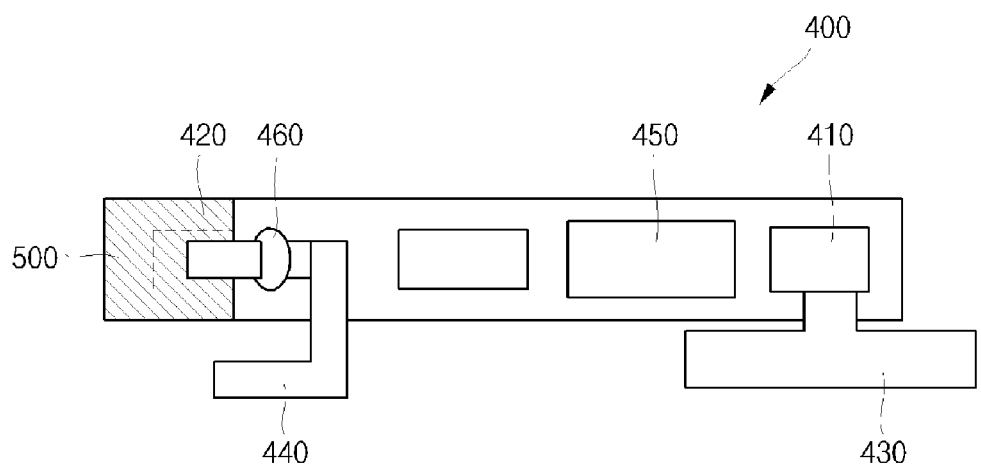
FIG. 2 is a plane view illustrating a holder cap attached to a protective circuit cover, according to the first example embodiment of the present invention.

Referring to FIGS. 1 and 2, a lithium polymer battery according to a first example embodiment of the present invention includes a bare cell 300 comprising an electrode assembly 100 and exterior material 200 receiving the electrode assembly 100, and a protective circuit cover 400 installed on a front surface of the exterior material 200.

The electrode assembly 100 is formed by laminating a first electrode plate 110, a separator 130 and a second electrode plate 120, and winding them in a jelly roll shape. A first electrode tap 140 is attached on the first electrode plate 110, and a second electrode tap 150 is attached on the second electrode plate 120, respectively.

The exterior material 200 includes a first region 210 to the inside that receives the electrode assembly 100, and a second region 220 formed integrally with an end part of the first region 210 so as to cover the first region 210.

The first region 210 and the second region 220 are heat-bonded at left and right side surfaces 230 and 240 such that the electrode assembly 100 is received in the inside of the exterior material 200. A sealed bare cell 300 is then formed by heat-bonding a leading edge part of the front surface 250 of the exterior material such that the first and second electrode taps 140 and 150 of the electrode assembly 100 extend out beyond the front surface of the exterior material 200.

The exterior material 200 is heat-bonded on both side surfaces 230 and 240 or the front surface 250, and is exposed through a cut region to the outside such that the metal film 201 is interposed between the insulating layers 202 and 203.

The protective circuit cover 400 is located on the front surface 250 of the exterior material 200. The first and second electrode taps 140 and 150 of the electrode assembly 100 extending beyond the front surface 250 of the exterior material 200 of the bare cell 300 are respectively coupled to the tap connection terminals 410 and 420 and connecting leads 430 and 440 included on an inner surface of the protective circuit cover 400.

A protective circuit element 450 and a safety element 460 (shown in FIG. 2) as well as the tap connection terminals 410 and 420 are installed on an inner surface of the protective circuit cover 400. Outer terminals 470 are installed on an outer surface of the protective circuit cover 400.

FIG. 1 shows the holder cap 500 detached from the protective circuit cover 400. FIG. 2 is a plane view illustrating the holder cap 500 inserted on one end part of the protective circuit cover 400.

The holder cap 500 may be installed not only on one end part of the protective circuit cover 400, but also on both end parts of the protective circuit cover 400. When the second electrode tap 150 is formed as an anode tap, a terminal 420 coupled to the second electrode tap 150 is installed so as to interrupt contact with the leading edge part 242 of a side surface of the exterior material 200.

Referring back to FIG. 1, the holder cap 500 is formed in rectangular shape, and includes an outer cap 520 and an inner cap 530 that are spaced apart from each other by the body 510 of the holder cap 500.

The holder cap 500 is formed in a shape that wraps around a part of the outer surface, a part of the inner surface and the edges of the protective circuit cover 400. The holder cap 500 may have any shape that can be installed and fixed on the protective circuit cover 400 while protecting a region where the protective circuit element 450 or the safety element 460 is installed.

The holder cap 500 installed on one end part of the protective circuit cover 400 blocks the metal film 201 exposed through the leading edge region of one side surface 240, i.e., a cut region 242 of the exterior material 200, so that the metal film 210 will not be in contact with the tap connection terminal 420. In other words, the tap connection terminal 420 is isolated from the outside and covered by the holder cap 500 so as to be insulated from the outside.

It is desirable that the holder cap 500 is not separated from the protective circuit cover 400, when the holder cap 500 is assembled on the protective circuit cover 400 by inserting the holder cap 500 such that it adheres to both edges of the protective circuit cover 400. For example, the holder cap 500 is assembled on the protective circuit cover 400 by force insertion.

Figure 3:
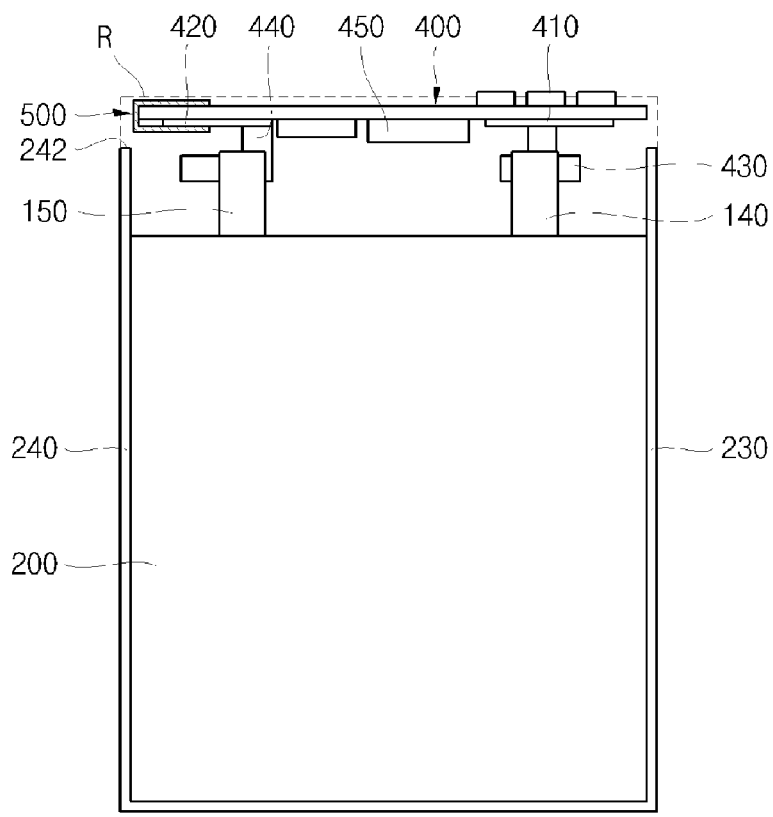
FIG. 3 is a front view illustrating the lithium polymer battery, according to the first example embodiment of the present invention.

Referring to FIG. 3, when the holder cap 500 is assembled over a region where the tap connection terminal 420 is installed on one end part of the protective circuit cover 400, the tap connection terminal 420 of the protective circuit cover 400 is completely isolated from the cut region 242 of one side surface 240 of the exterior material 200 by the holder cap 500. Accordingly, corrosion or a minute electrical short of the tap connection terminal 420 that could result from contact with the metal film 201 exposed through the cut region 242 of the exterior material 200 can be prevented.

Referring to FIG. 3, when the holder cap 500 is installed on one end part of the protective circuit cover 400, the pressure of melting resin is dispersed by the holder cap 500 when melting resin is injected to seal the battery assembly in order to form a resin molding part (R) by a hot-melting method. Accordingly, damage to various protective circuit elements and the tap connection terminal 420 may be prevented by reducing the injection pressure of the melting resin on the protective circuit cover 400.

Figure 4A:
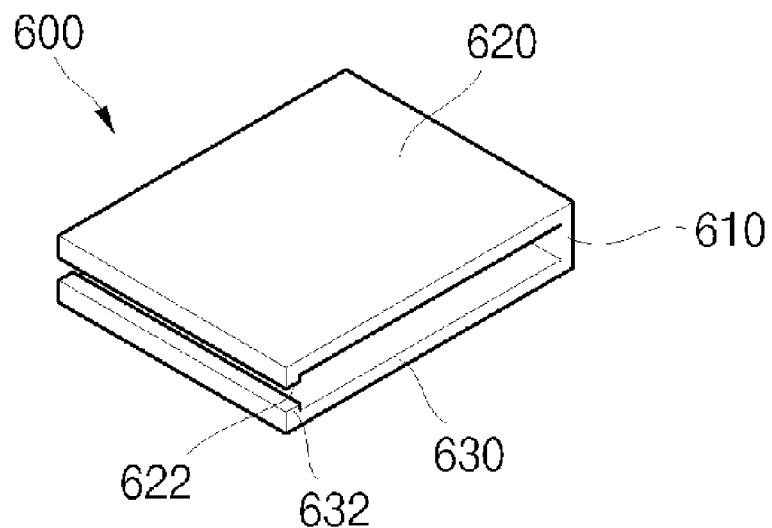
FIGS. 4A and 4B are a perspective view and a cross-sectional view of the lithium polymer battery, according to another example embodiment of the present invention.
Figure 4B:
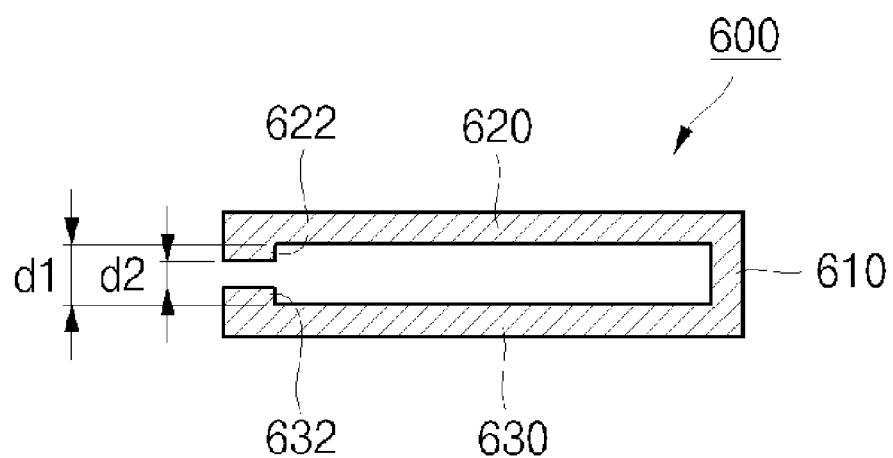

FIGS. 4A and 4B are a perspective view and a cross-sectional view illustrating a holder cap 600 according to another example embodiment of the present invention. The holder cap 600 is more firmly attached on the protective circuit cover without attaching the holder cap 600 on the protective circuit cover by the forcible insertion method.

The holder cap 600 is formed integrally with the body 610, and locking ridges 622 and 623 are formed on end parts of the outer cap 620 and the inner cap 630 which are formed to be spaced apart from each other. The locking ridge may be formed on any one side of the outer cap 620 and the inner cap 630.

The distance (d2) between the locking ridges 622 and 632 along the end parts of the holding cap 600 is less than the distance (d1) between the outer cap 620 and the inner cap 630 (i.e., d1>d2). Accordingly, when the holder cap 600 is inserted on one end part of the protective circuit cover 400, the holder cap 600 is inserted such that the end parts of the outer cap 620 and the inner cap 630 widen. If the applied force is removed after inserting the holder cap 600, the outer cap 620 and the inner cap 630 are restored to their original shape. The locking ridge 622 of the outer cap 620 is supported by part of the outer surface near the edge of the protective circuit cover 400, and the locking ridge 623 of the inner cap 630 is supported by a similar part of the inner surface of the protective circuit cover 400, so that the holder cap 600 is fixed securely on the protective circuit cover 400.

The lithium polymer battery according to aspects of the present invention produces the following effects. First, electrochemical corrosion or an electrical short from contact of the metal film of the cut region of the external material with the connecting lead or the terminal of the adjacent protective circuit cover can be prevented. Therefore, the swelling phenomenon from corrosion of the battery or the voltage drop from a short circuit can be reduced, thereby minimizing battery defects; thus reliability to customers is improved. Also, when melting resin is injected to seal the battery assembly, the injection pressure of the melting resin across the protective cover and holding cap is reduced, thereby preventing damage to the components.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A lithium polymer battery, comprising:
    a chargeable and dischargeable bare cell comprising an electrode assembly and an exterior case, the exterior case comprising a metallic layer interposed between two insulating layers, the metallic layer being exposed along an edge of the exterior case;
    a protective circuit cover comprising an inner surface and an outer surface, the protective circuit cover installed on one side of the bare cell and coupled to the bare cell, the protective circuit cover comprising an electrically conductive terminal on the inner surface facing the metallic layer exposed along the edge of the exterior case; and
    a holder cap comprising an inner cap, an outer cap, and a body connecting the inner cap and the outer cap such that the inner cap opposes the outer cap with a gap therebetween, wherein part of the protective circuit cover is inserted between the inner cap and the outer cap, and wherein the inner cap covers at least part of the electrically conductive terminal and contacts the metallic layer, and wherein the electrically conductive terminal would contact the metallic layer exposed along the edge of the exterior case but for the holder cap,
    wherein a resin molding part seals both the protective circuit cover and the holder cap, and wherein a locking ridge is formed on an end part of at least one of the inner cap and the outer cap of the holder cap.

2. The lithium polymer battery of claim 1, wherein the holder cap is installed at a position where a protective circuit element or a tap connection terminal installed on one surface of the protective circuit cover is hidden.

3. The lithium polymer battery of claim 1, wherein the holder cap is configured to sheath at least one end part of the protective circuit cover.

4. The lithium polymer battery of claim 1, wherein the holder cap is formed in a rectangular shape, and the body is formed integrally with the outer cap and the inner cap.

5. The lithium polymer battery of claim 1, wherein the holder cap is inserted and fixed on an edge of the protective circuit cover by force insertion.

6. The lithium polymer battery of claim 1, wherein the holder cap is formed of insulating material.

7. The lithium polymer battery of claim 1, wherein the electrode assembly comprises:
    a first electrode plate equipped with a first electrode tap,
    a second electrode plate equipped with a second electrode tap, and
    a separator interposed between the first electrode plate and the second electrode plate.

8. The lithium polymer battery of claim 7, further comprising:
    a first tap connection terminal coupled to the first electrode tap and a second tap connection terminal coupled to the second electrode tap of the bare cell;
    a protective circuit element disposed on the inner surface of the protective circuit cover; and
    an outer terminal disposed on the outer surface of the protective circuit cover.

9. The lithium polymer battery of claim 1, wherein the inner cap is interposed between the at least part of the protective circuit cover and the edge of the exterior case where the metallic layer is exposed.

10. The lithium polymer battery of claim 1, wherein the holder cap is configured to electrically decouple the electrically conductive terminal from the metallic layer.

* * * * *